(12) United States Patent
Yura et al.

(10) Patent No.: US 10,629,905 B2
(45) Date of Patent: *Apr. 21, 2020

(54) POSITIVE ELECTRODE

(71) Applicant: NGK INSULATORS, LTD., Nagoya-Shi (JP)

(72) Inventors: Yukinobu Yura, Nagoya (JP); Naoto Ohira, Nagoya (JP); Shigeki Okada, Nishio (JP)

(73) Assignee: NGK Insulators, Ltd., Nagoya (JP)

( * ) Notice: Subject to any disclaimer, the term of this patent is extended or adjusted under 35 U.S.C. 154(b) by 23 days.

This patent is subject to a terminal disclaimer.

(21) Appl. No.: 15/952,571

(22) Filed: Apr. 13, 2018

(65) Prior Publication Data
US 2018/0233745 A1 Aug. 16, 2018

Related U.S. Application Data

(63) Continuation of application No. PCT/JP2017/016341, filed on Apr. 25, 2017.

(30) Foreign Application Priority Data

Apr. 25, 2016 (JP) .................................. 2016-087110
Jul. 27, 2016 (JP) .................................. 2016-147855

(51) Int. Cl.
*H01M 4/525* (2010.01)
*H01M 10/0566* (2010.01)
(Continued)

(52) U.S. Cl.
CPC ............ *H01M 4/525* (2013.01); *C01G 51/42* (2013.01); *H01M 4/131* (2013.01);
(Continued)

(58) Field of Classification Search
CPC .. H01M 4/525; H01M 4/131; H01M 10/0566; H01M 10/0525; H01M 10/0562;
(Continued)

(56) References Cited

U.S. PATENT DOCUMENTS

| | | | | |
|---|---|---|---|---|
| 2002/0074972 | A1* | 6/2002 | Narang | H01M 4/13 320/131 |
| 2007/0009798 | A1* | 1/2007 | Inagaki | C01G 23/005 429/231.1 |

(Continued)

FOREIGN PATENT DOCUMENTS

| | | | |
|---|---|---|---|
| JP | 2003-132887 A1 | 5/2003 | |
| JP | 2011-108407 A1 | 6/2011 | |

(Continued)

OTHER PUBLICATIONS

International Search Report and Written Opinion (Application No. PCT/JP2017/016341) dated Jul. 11, 2017 (with English translation).

(Continued)

*Primary Examiner* — Eugenia Wang
(74) *Attorney, Agent, or Firm* — Burr & Brown, PLLC

(57) ABSTRACT

A positive electrode is configured by a plurality of mutually bonded primary particles respectively composed of a lithium composite oxide having a layered rock-salt structure. An average orientation angle of the plurality of primary particles relative to a plate face direction parallel to a plate face is more than 0° and less than or equal to 30°. An aggregate area of primary particles that have an orientation angle relative to the plate face direction of more than 0° and less than or equal to 30° is greater than or equal to 70% relative to a total area of the plurality of primary particles, in a cross section.

12 Claims, 4 Drawing Sheets

(51) Int. Cl.
- *H01M 10/0525* (2010.01)
- *H01M 4/131* (2010.01)
- *C01G 51/00* (2006.01)
- *H01M 10/052* (2010.01)
- *H01M 4/02* (2006.01)

(52) U.S. Cl.
CPC ... *H01M 10/0525* (2013.01); *H01M 10/0566* (2013.01); *C01G 51/00* (2013.01); *C01P 2004/61* (2013.01); *C01P 2006/42* (2013.01); *H01M 10/052* (2013.01); *H01M 2004/021* (2013.01); *H01M 2004/028* (2013.01)

(58) Field of Classification Search
CPC ......... H01M 10/052; H01M 2004/021; H01M 2004/028; C01G 51/42; C01G 51/00; C01P 2006/42; C01P 2006/161; C01P 2004/61

See application file for complete search history.

(56) References Cited

U.S. PATENT DOCUMENTS

| | | | | |
|---|---|---|---|---|
| 2010/0112443 | A1* | 5/2010 | Blomgren | H01M 4/131 |
| | | | | 429/221 |
| 2010/0159332 | A1 | 6/2010 | Sugiura et al. | |
| 2012/0009470 | A1 | 1/2012 | Sugiura et al. | |
| 2012/0251858 | A1* | 10/2012 | Kato | H01G 11/76 |
| | | | | 429/82 |
| 2013/0065120 | A1 | 3/2013 | Miwa et al. | |
| 2015/0093580 | A1* | 4/2015 | Kobayashi | H01M 4/131 |
| | | | | 428/403 |
| 2015/0236372 | A1* | 8/2015 | Yushin | H01M 10/052 |
| | | | | 429/126 |
| 2016/0087272 | A1 | 3/2016 | Blomgren et al. | |
| 2017/0317334 | A1 | 11/2017 | Yura et al. | |

FOREIGN PATENT DOCUMENTS

| | | | |
|---|---|---|---|
| JP | 2012-009193 | A1 | 1/2012 |
| WO | WO2010/074304 | A1 | 7/2010 |
| WO | 2016/117499 | A1 | 7/2016 |

OTHER PUBLICATIONS

Extended European Search Report, European Application No. 17789514.1, dated Oct. 11, 2018 (7 pages).
U.S. Appl. No. 15/952,540, filed Apr. 13, 2018, Naoto Ohira et al.
U.S. Appl. No. 15/952,593, filed Apr. 13, 2018, Yukinobu Yura et al.
U.S. Appl. No. 15/952,620, filed Apr. 13, 2018, Yukinobu Yura et al.
European Office Action (Application No. 17789514.1) dated May 14, 2019.
English Translation of International Preliminary Report on Patentability, International Application No. PCT/JP2017/016341, dated Nov. 8, 2018 (6 pages).

* cited by examiner

POSITIVE ELECTRODE

BACKGROUND OF THE INVENTION

1. Field of the Invention

The present invention relates to a positive electrode.

2. Description of Related Art

A typical positive electrode for a lithium ion battery is a positive electrode which is configured by bonding of a plurality of primary particles composed of a lithium composite oxide having a layered rock-salt structure.

A method has been proposed to orientate the (003) plane of the primary particles in a direction that intersects the plate face to enable exposure on the plate face of the crystal plane that facilitates intercalation and deintercalation of lithium ions (reference is made to PCT Laid Open Application 2010/074304).

SUMMARY OF THE INVENTION

In this regard, as a result of the diligent research conducted by the present inventors, the new insight has been gained that it is preferred to reduce the angle of inclination of the (003) plane of the primary particles relative to the plate face in order to enhance the rate characteristics of the positive electrode.

The present invention is proposed based on the new insight above, and has the object of providing a positive electrode that enables enhancement of rate characteristics.

Solution to Problem

The positive electrode according to the present invention is configured by a plurality of mutually bonded primary particles respectively composed of a lithium composite oxide having a layered rock-salt structure. An average orientation angle of the plurality of primary particles relative to a plate face direction that is parallel to the plate face is more than 0° and less than or equal to 30°. The aggregate area of primary particles that have an orientation angle relative to the plate face direction of more than 0° and less than or equal to 30° is greater than or equal to 70% relative to the total area of the plurality of primary particles, in cross section.

Advantageous Effects of Invention

The present invention provides a positive electrode that enables enhancement of rate characteristics.

DETAILED DESCRIPTION OF THE INVENTION

Lithium Ion Battery 100

Figure 1:
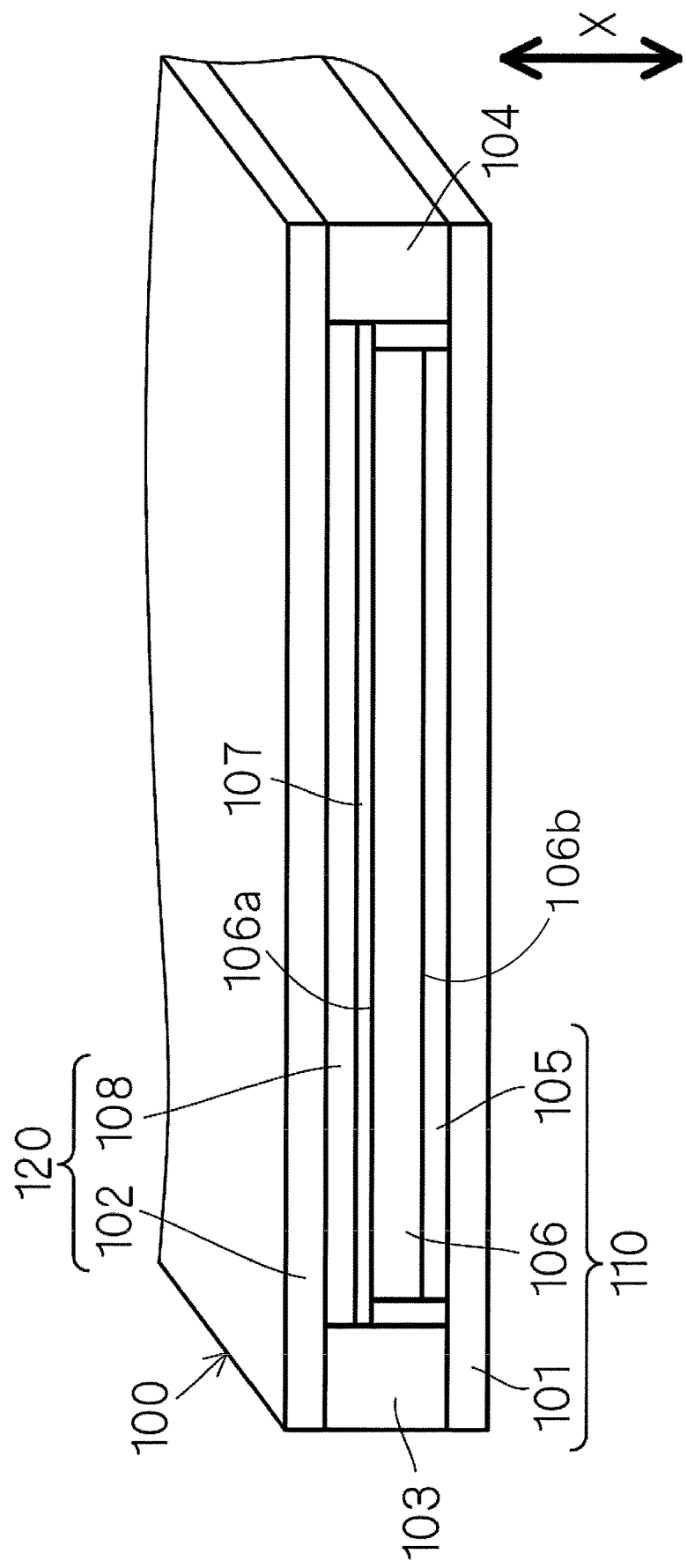
FIG. 1 is a cross sectional view schematically illustrating a configuration of a lithium ion battery.

FIG. 1 is a cross sectional view illustrating a configuration of a lithium ion battery. A chip-type lithium battery 100 configured as a plate piece is a secondary battery (rechargeable battery) that is capable of repetitive use as a result of charging and discharging.

The lithium battery 100 comprises a positive electrode-side current collecting layer 101, a negative electrode-side current collecting layer 102, outer cladding 103, 104, a current collecting connection layer 105, a positive electrode 106, a solid electrolyte layer 107 and the negative electrode layer 108. The lithium ion battery 100 has a configuration in which the positive electrode-side current collecting layer 101, the current collecting connection layer 105, the positive electrode 106, the solid electrolyte layer 107, the negative electrode layer 108 and the negative electrode-side current collecting layer 102 are sequentially stacked in a stacking direction X.

The end portion in the direction of plate width of the lithium ion battery 100 is sealed by the outer cladding 103, 104. A positive electrode portion 110 is configured by the positive electrode-side current collecting layer 101, the current collecting connection layer 105 and the positive electrode 106. A negative electrode portion 120 is configured by the negative electrode-side current collecting layer 102 and the negative electrode layer 108.

1. Positive Electrode-Side Current Collecting Layer 101

The positive electrode-side current collecting layer 101 is disposed on an outer side of the positive electrode 106. The positive electrode-side current collecting layer 101 is mechanically and electrically connected through the current collecting connection layer 105 to the positive electrode 106. The positive electrode-side current collecting layer 101 can function as a positive electrode current collector.

The positive electrode-side current collecting layer 101 can be composed of metal. The metal that configures the positive electrode-side current collecting layer 101 includes stainless steel, aluminum, copper, platinum, nickel and the like, with aluminum, nickel and stainless steel being particularly suitable. The positive electrode-side current collecting layer 101 may be formed in a plate shape or a foil shape, with a foil shape being particularly preferred. Therefore, use of an aluminum foil, a nickel foil, or a stainless steel foil is particularly preferred as the positive electrode-side current collecting layer 101. When the positive electrode-side current collecting layer 101 is shaped as a foil, the thickness of the positive electrode-side current collecting layer 101 may be configured to 1 to 30 µm, preferably as greater than or equal to 5 and less than or equal to 25 µm, and more preferably as greater than or equal to 10 and less than or equal to 20 µm.

2. Negative Electrode-Side Current Collecting Layer 102

The negative electrode-side current collecting layer 102 is disposed on an outer side of the negative electrode layer 108. The negative electrode-side current collecting layer 102 is mechanically and electrically connected to the negative electrode layer 108. The negative electrode-side current collecting layer 102 can function as a negative electrode current collector. The negative electrode-side current collecting layer 102 can be composed of metal. The negative electrode-side current collecting layer 102 can be composed of the same material as the positive electrode-side current collecting layer 101. Therefore use is preferred of an aluminum foil, a nickel foil, or a stainless steel foil as the negative electrode-side current collecting layer 102. When the negative electrode-side current collecting layer 102 is shaped as a foil, the thickness of the negative electrode-side current collecting layer 102 may be configured to 1 to 30 μm, preferably as greater than or equal to 5 and less than or equal to 25 μm, and more preferably as greater than or equal to 10 and less than or equal to 20 μm.

3. Outer Cladding 103, 104

The outer cladding 103 and 104 seals a gap between the positive electrode-side current collecting layer 101 and the negative electrode-side current collecting layer 102. The outer cladding 103 and 104 encloses the lateral side of a unit battery configured by the positive electrode 106, the solid electrolyte layer 107 and the negative electrode layer 108. The outer cladding 103, 104 inhibits the entry of moisture into the lithium ion battery 100.

In order to ensure electrical insulation between the positive electrode-side current collecting layer 101 and the negative electrode-side current collecting layer 102, the resistivity of the outer cladding 103 and 104 is preferably greater than or equal to $1 \times 10^6$ Ωcm, more preferably greater than or equal to $1 \times 10^7$ Ωcm, and still more preferably greater than or equal to $1 \times 10^8$ Ωcm. This type of outer cladding 103 and 104 may be composed of a sealing material that exhibits electrical insulating characteristics. The sealing material includes use of a resin-based sealing material containing a resin. Use of a resin-based sealing material enables formation of the outer cladding 103 and 104 at a relatively low temperature (for example less than or equal to 400° C.) and therefore it is possible to inhibit damage or deterioration of the lithium ion battery 100 due to heat.

The outer cladding 103 and 104 may be formed by stacking a resin film, by dispensing a liquid resin, or the like.

4. Current Collecting Connection Layer 105

The current collecting connection layer 105 is disposed between the positive electrode-side current collecting layer 101 and the positive electrode 106. The current collecting connection layer 105 mechanically bonds the positive electrode 106 to the positive electrode-side current collecting layer 101 and electrically bonds the positive electrode 106 to the positive electrode-side current collecting layer 101.

The current collecting connection layer 105 includes a conductive material and an adhesive. The conductive material may include use of conductive carbon or the like. The adhesive may include use of an epoxy or the like. Although there is no particular limitation in relation to the thickness of the current collecting connection layer 105, it may be configured as greater than or equal to 5 μm and less than or equal to 100 μm, and preferably greater than or equal to 10 μm and less than or equal to 50 μm.

However the current collecting connection layer 105 may omit the adhesive. In this configuration, an electrical connection between the positive electrode 106 and the current collecting connection layer 105 may be created by configuring the current collecting connection layer 105 as a direct connection film (for example, gold or aluminum) on the rear surface of the positive electrode 106.

5. Positive Electrode 106

The positive electrode 106 is formed in a plate shape. The positive electrode 106 includes a solid electrolyte-side surface 106a and a current collecting connection layer-side surface 106b. The positive electrode 106 is connected to the solid electrolyte layer 107 on the solid electrolyte-side surface 106a. The positive electrode 106 is connected to the current collecting connection layer 105 on the current collecting connection layer-side surface 106b. The solid electrolyte-side surface 106a and the current collecting connection layer-side surface 106b respectively form a "plate face" of the positive electrode 106. Upon observation of a cross section of the positive electrode 106 by use of a scanning electron microscope (SEM), the solid electrolyte-side surface 106a is an approximately straight line obtained by a least squares method defining the interface between the positive electrode 106 and the solid electrolyte layer 107. Upon observation of a cross section of the positive electrode 106 by SEM, the current collecting connection layer-side surface 106b is an approximately straight line obtained by a least squares method defining the interface between the positive electrode 106 and the current collecting connection layer 105.

A processing operation such as polishing or the like may be applied to the solid electrolyte-side surface 106a of the positive electrode 106. In this manner, even in a configuration in which the film thickness of the solid electrolyte layer 107 is reduced as a result of a change in the surface configuration of the solid electrolyte-side surface 106a, it is possible to inhibit a reduction in the film properties of the solid electrolyte layer 107. The means of varying the surface configuration of the solid electrolyte-side surface 106a is not limited to a polishing processing operation, and the surface configuration of the solid electrolyte-side surface 106a may also be changed as a result of a method of coating and firing a microparticle active material, or a means of forming the solid electrolyte layer 107 by a gas phase method such as sputtering or the like.

Although there is no particular limitation in relation to the thickness of the positive electrode 106, it may be configured as greater than or equal to 20 μm, preferably greater than or equal to 25 μm, and more preferably greater than or equal to 30 μm. In particular, a configuration in which the thickness of the positive electrode 106 is greater than or equal to 50 μm makes it possible to increase the energy density of the lithium ion battery 100 by ensuring a sufficient active material capacity per unit area. Furthermore although there is no particular limitation on the upper limiting value of the thickness of the positive electrode 106, when inhibiting the deterioration of battery characteristics (in particular an increase in the resistance value) that results from repetitive charging and discharging is taken into account, a value of less than 200 μm is preferred, a value of less than or equal to 150 μm is more preferred, a value of less than or equal to 120 μm is still more preferred, and a value of less than or equal to 100 μm is particularly preferred.

When a cross section of the positive electrode 106 is observed by SEM, the thickness of the positive electrode 106 is obtained by measurement of the average distance (average value of a distance at 3 arbitrary points) in the thickness direction of the solid electrolyte-side surface 106a and the current collecting connection layer-side surface 106b. The thickness direction is a direction that is vertical in relation to the solid electrolyte-side surface 106a and the current collecting connection layer-side surface 106b and is substantially the same as the stacking direction X.

A coefficient of expansion-contraction at charge/discharge in a direction parallel to the plate face of the positive electrode 106 (referred to below as "plate face direction") is preferably suppressed to less than or equal to 0.7%. In this manner, when the coefficient of expansion-contraction of the positive electrode 106 is sufficiently low, even when the thickness of the positive electrode 106 is configured to be less than or equal to 30 μm for the purpose of enhancing the rate characteristics of the lithium ion battery 100, it is possible to inhibit peeling of the positive electrode 106 and/or a defect in the solid electrolyte layer 107. Therefore the thickness of the positive electrode 106 may be suitably set taking into account the coefficient of expansion-contraction of the positive electrode 106 and the discharge capacity of the lithium ion battery 106.

The microstructure of the positive electrode 106 will be discussed below.

6. Solid Electrolyte Layer 107

The solid electrolyte layer 107 is preferably composed of a lithium phosphate oxynitride (LiPON) ceramic material that is known to be an oxide-based ceramic material. The thickness of the solid electrolyte layer 107 preferably has a thin configuration to thereby enhance lithium ion conductivity, and may be suitably set by taking into account reliability during charging and discharging (cracking, separator function, inhibiting a defect or the like). The thickness of the solid electrolyte layer 107 for example is preferably 0.1 to 10 μm, more preferably 0.2 to 8.0 μm, still more preferably 0.3 to 7.0 μm, and particularly preferably 0.5 to 6.0 μm.

A sputtering method is preferably used as a method of film formation for attaching the solid electrolyte layer 107 that is formed from a ceramic material to the solid electrolyte-side surface 106a of the positive electrode 106. At that time, the thickness of the solid electrolyte layer 107 can be adjusted by controlling the film formation conditions (for example, film formation time) used in the sputtering method. The positive electrode 106 does not tend to cause a defect in battery function even when the battery is configured by forming a solid electrode layer composed of LiPON on the surface by use of a sputtering method.

LiPON is a group of compounds represented by a composition of $Li_{2.9}PO_{3.3}N_{0.46}$, and for example, is a group of compounds represented by $Li_aPO_bN_c$ (wherein, a is 2 to 4, b is 3 to 5, and c is 0.1 to 0.9). Therefore, the formation of a LiPON-based solid electrolyte layer by sputtering may be performed using a lithium phosphate sintered body target as an Li source, a P source and an O source, and carried out according to known conditions by introducing $N_2$ as a gas species for the N source. Although there is no particular limitation on the sputtering method, use of an RF magnetron method is preferred. Furthermore, in substitution for the sputtering method, a film formation method such as an MOCVD method, a sol gel method, an aerosol deposition method, a screen printing or the like may be used.

The solid electrolyte layer 107 may be composed of an oxide-based ceramic material other than a LiPON-based ceramic material. The oxide-based ceramic material other than a LiPON-based ceramic material includes at least one type selected from the group consisting of a garnet-based ceramic material, a nitride-based ceramic material, a perovskite-based ceramic material, a phosphate-based ceramic material and a zeolite-based ceramic material. An example of the garnet ceramic material includes use of an Li—La—Zr—O-based material (specifically $Li_7La_3Zr_2O_{12}$, or the like) and an Li—La—Ta—O-based material. An example of the perovskite-based ceramic material includes use of an Li—La—Ti—O-based material (specifically $LiLa_{1-x}Ti_xO_3$ (0.04≤x≤0.14), or the like). An example of the phosphate-based ceramic material includes use of Li—Al—Ti—P—O, Li—Al—Ge—P—O and Li—Al—Ti—Si—P—O (specifically $Li_{1+x+y}Al_xTi_{2-x}Si_yP_{3-y}O_{12}$ (0≤x≤0.4, 0≤y≤0.6) or the like).

The solid electrolyte layer 107 may also be composed of a sulfide based material. The sulfide based material includes use of a material selected from a solid electrolyte based on $Li_2S—P_2S_5$, $LiI—Li_2S—P_2S_5$, $LiI—Li_2S—B_2S_{32}$, or $LiI—Li_2S—SiS_2$, Thio-LISICON, and Li10GeP2S12, or the like.

A sulfide based material is comparatively soft, and therefore the battery can be configured by forming a solid electrolyte layer by compaction using a press of a sulfide-based powder onto the surface of the positive electrode 106. More specifically, the solid electrolyte layer can be formed by stacking and pressing a sulfide-based powder body configured in a sheet shape by using a binder or the like onto the positive electrode 106, or by pressing after coating and drying a slurry in which a sulfide-based powder is dispersed onto the positive electrode 106.

7. Negative Electrode Layer 108

The negative electrode layer 108 is disposed on the solid electrolyte layer 107. The negative electrode layer 108 contains a principal component of lithium metal. The negative electrode layer 108 may be configured as a lithium-containing metal film formed on the solid electrolyte layer 107. The lithium-containing metal film may be formed by a vacuum deposition method, a sputtering method, a CVD method, or the like.

Although there is no particular limitation on the thickness of the negative electrode layer 108, it may be configured as less than or equal to 200 μm. When the feature of increasing the energy density by ensuring a large total lithium amount in the lithium battery 100 is taken into account, it is preferred that the thickness of the negative electrode layer 108 is greater than or equal to 10 μm, preferably greater than or equal to 10 μm and less than or equal to 50 μm, more preferably greater than or equal to 10 μm and less than or equal to 40 μm, and particularly preferably greater than or equal to 10 μm and less than or equal to 20 μm.

Microstructure of Positive Electrode 106

Figure 2:
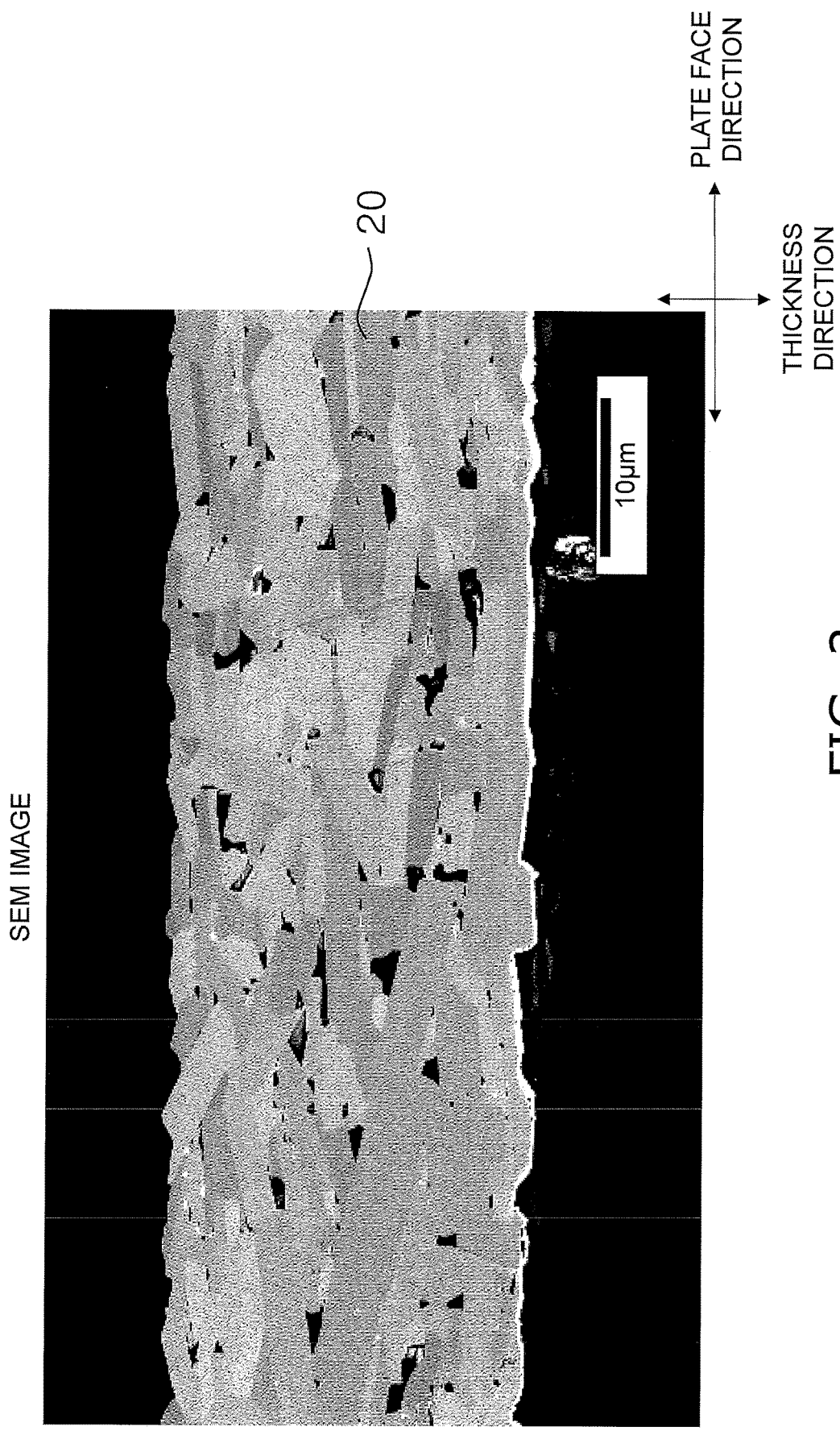
FIG. 2 is an SEM image showing an example of a cross section that is vertical to the plate face of the positive electrode.
Figure 3:
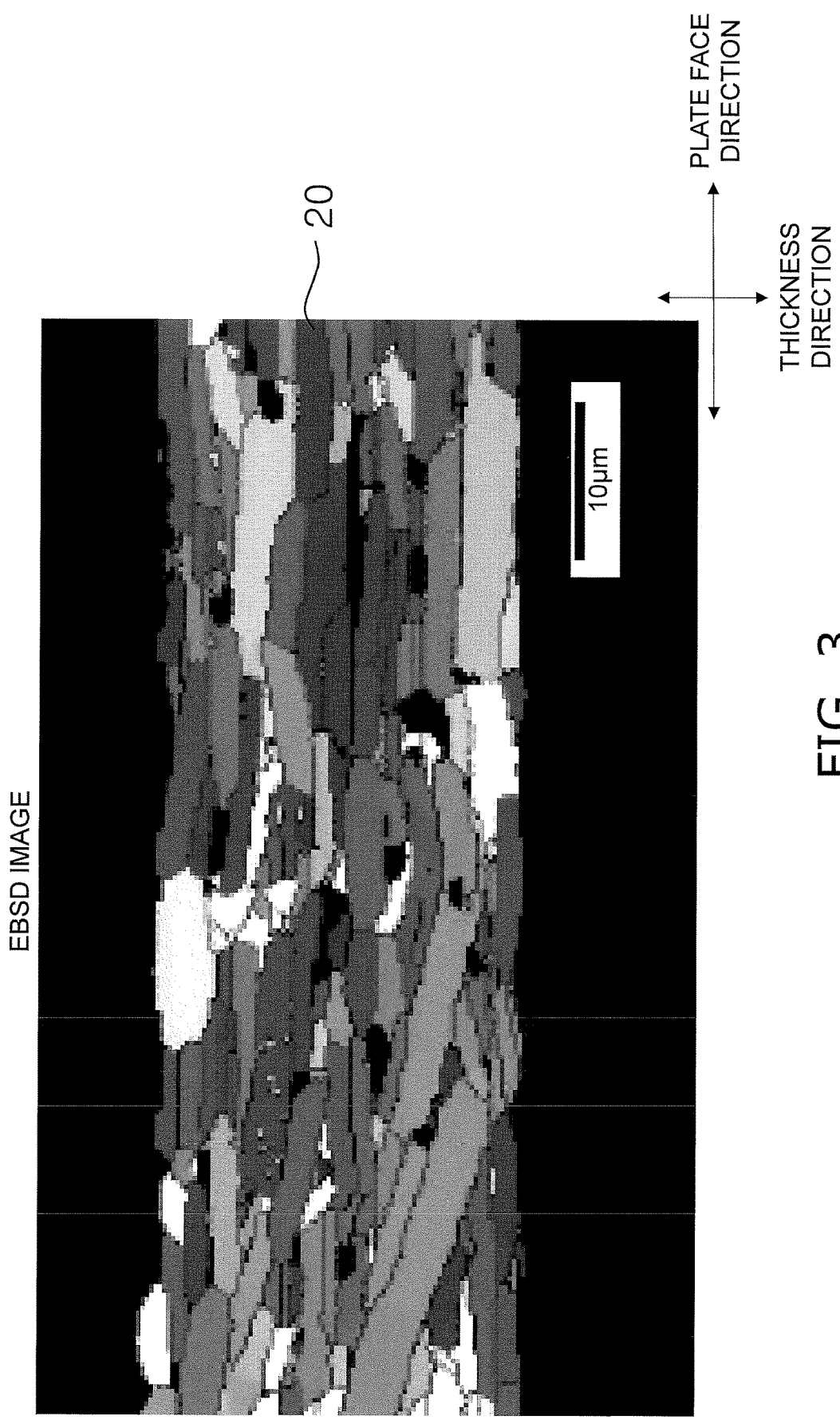
FIG. 3 is an EBSD image in the cross section of the positive electrode illustrated in FIG. 2.
Figure 4:
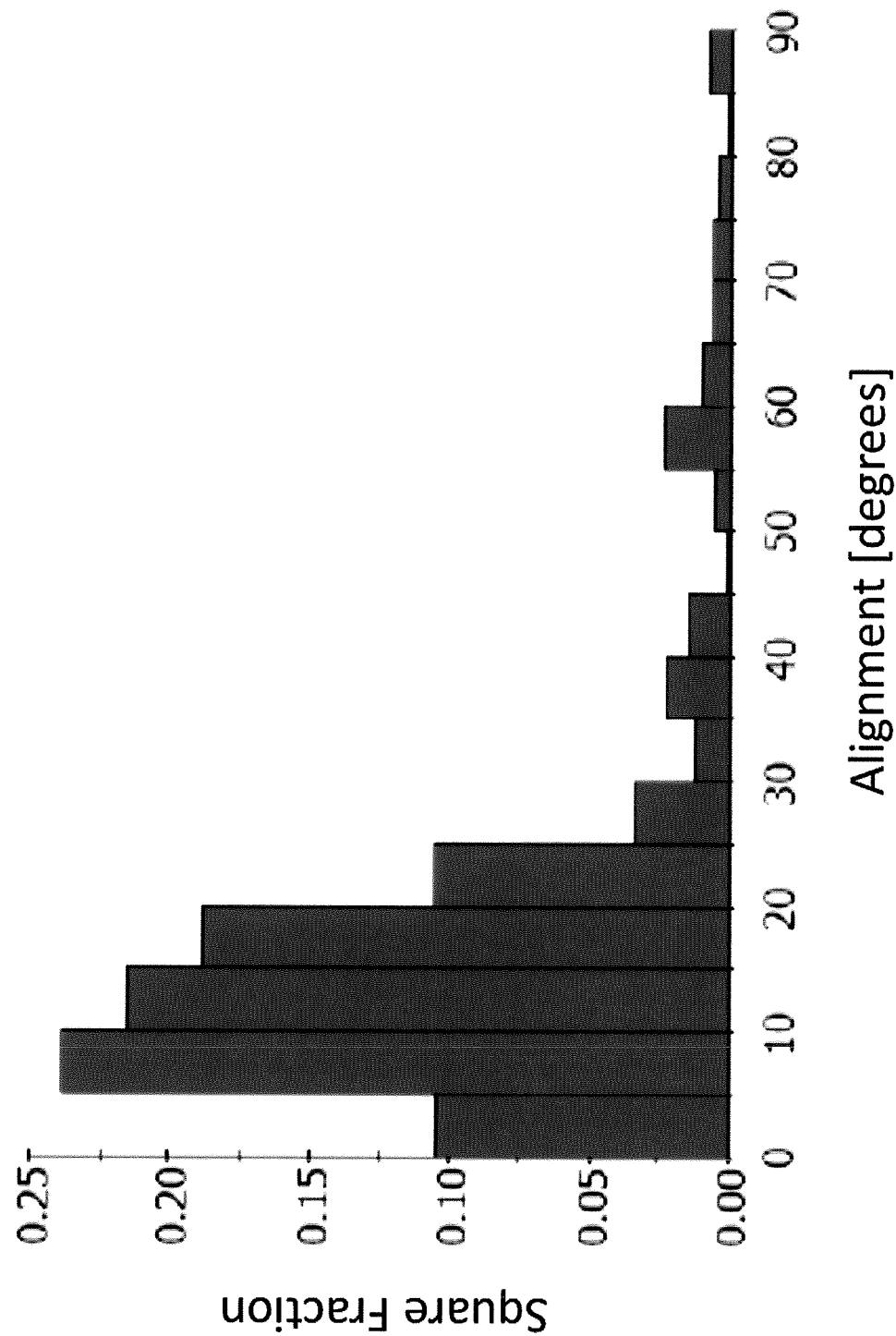
FIG. 4 is a histogram using an area basis to illustrate the distribution of an orientation angle of primary particles in the EBSD image illustrated in FIG. 3.

FIG. 2 is a SEM image showing an example of a cross section that is vertical to the plate face of the positive electrode 106. FIG. 3 is an electron backscatter diffraction (EBSD) image in the cross section that is vertical to the plate face of the positive electrode 106. FIG. 4 is a histogram using an area basis to illustrate the distribution of an orientation angle of the primary particles 20 in the EBSD image illustrated in FIG. 3.

In the EBSD image illustrated in FIG. 3, a discontinuity in the crystal orientation can be observed. In FIG. 3, the orientation angle of each primary particle 20 is categorized, such that the darker the color, the smaller the orientation angle. The orientation angle is the angle of inclination subtended by the (003) surface of each primary particle 20 relative to the plate face direction. In FIG. 2 and FIG. 3, the positions illustrated in black in the inner portion of the positive electrode 106 are pores.

1. Structure of Positive Electrode 106

The positive electrode 106 is formed by bonding of a plurality of primary particles 20. Each primary particle 20 is formed mainly in a plate shape. However, a configuration such as rectangular, cubic and spherical or the like may also be included. There is no particular limitation on the cross sectional shape of each primary particle 20, and it may be oblong, a polygonal shape other than oblong, circular, oval, or another complex shape in addition to the above shapes.

2. Constituent Material of Primary Particles 20

Each primary particle 20 is composed of a lithium complex oxide. A lithium complex oxide is an oxide that is expressed as $Li_xMO_2$ (wherein 0.05<x<1.10, and wherein M is at least one type of transition metal, and M typically includes one or more types of Co, Ni, Mn). A lithium complex oxide has a layered rock-salt structure. A layered rock-salt structure is a crystalline structure in which a lithium layer and a transition metal layer other than lithium are alternately layered to sandwich an oxygen layer, that is to say, a crystalline structure in which a transition metal ion layer is alternatively layered with a lithium single layer through an oxide ion (typically, an α-NaFeO$_2$ type structure, that is to say, a structure in which a transition metal and lithium are regularly ordered in an [111] axial direction of cubic crystal rock-salt structure).

A lithium complex oxide for example includes Li$_x$CoO$_2$ (lithium cobalt oxide), Li$_x$NiO$_2$ (lithium nickelate), Li$_x$MnO$_2$ (lithium manganate), Li$_x$NiMnO$_2$ (nickel-lithium manganate), Li$_x$NiCoO$_2$ (lithium-nickel-cobalt oxide), Li$_x$CoNiMnO$_2$ (lithium cobalt nickel manganate), Li$_x$CoMnO$_2$ (cobalt-lithium manganate), with Li$_x$CoO$_2$ in particular being preferred.

A lithium complex oxide may include one or more elements of Mg, Al, Si, Ca, Ti, V, Cr, Fe, Cu, Zn, Ga, Ge, Sr, Y, Zr, Nb, Mo, Ag, Sn, Sb, Te, Ba, Bi, W or the like.

3. Average Orientation Angle of Primary Particles 20

As illustrated in FIG. 3 and FIG. 4, the average value of the orientation angle of each primary particle 20 (referred to below as "average orientation angle") is more than 0° and less than or equal to 30°.

In this manner, since each primary particle 20 is nestled in a direction that is inclined towards the thickness direction, the adhesion between each of the primary particles can be enhanced. As a result, the rate characteristics are improved since the lithium ion conductivity is enhanced between a given primary particle 20 and another primary particle 20 that is adjacent on both longitudinal sides of the first primary particle 20.

As shown in the present embodiment, when the positive electrode 106 is used in connection with the solid electrolyte layer 107, the cycle characteristics are enhanced. This feature is due to the fact that since each primary particle 20 is compressed in a direction that is perpendicular to the (003) plane in response to the intercalation and deintercalation of lithium ions, the expansion-contraction amount of the positive electrode 106 in the plate face direction is reduced as a result of the reduction in the angle of the (003) plane relative to the plate face direction and therefore it is possible to inhibit production of stress between the positive electrode 106 and the solid electrolyte layer 107.

Furthermore, as shown in the present embodiment, when the positive electrode 106 is used in connection with the solid electrolyte layer 107, the rate characteristics are further enhanced. As discussed above, this feature is due to the fact that during intercalation and deintercalation of lithium ions, the expansion-contraction of the positive electrode 106 in the thickness direction predominates over that in the plate face direction resulting in smooth expansion-contraction of the positive electrode 106, and consequently smooth intercalation and deintercalation of lithium ions.

The average orientation angle of the primary particles 20 is obtained by the following method. Firstly, as illustrated in FIG. 3, in the EBSD image in which a rectangular region of 95 μm×125 μm is observed at 1000-fold magnification, three horizontal lines that divide the positive electrode 106 into 4 equal parts in the thickness direction and three vertical lines that divide the positive electrode 106 into 4 equal parts in the plate face direction are drawn. Then, the arithmetic mean of orientation angles is calculated for all primary particles 20 that intersect at least one line of the three horizontal lines and three vertical lines to thereby obtain an average orientation angle of the primary particles 20.

In consideration of the further enhancement in the rate characteristics, the average orientation angle of the primary particles 20 is preferably less than or equal to 30°, and more preferably less than or equal to 25°. The average orientation angle of the primary particles 20 when the rate characteristics are considered in the same manner is preferably greater than or equal to 2°, and more preferably greater than or equal to 5°.

4. Distribution of Orientation Angle of Primary Particles 20

As illustrated in FIG. 4, the orientation angle of each primary particle 20 may exhibit a broad distribution from 0° to 90°. However, it is preferred that the majority is distributed in a region of more than 0° to less than or equal to 30°.

In the EBSD image illustrated in FIG. 3, the aggregate area of primary particles 20 that have an orientation angle of more than 0° to less than or equal to 30° (referred to below as "low angle primary particles") is preferably greater than or equal to 70% relative to the total area of the 30 primary particles 20 used in the calculation of the average orientation angle. In other words, when the cross section of the positive electrode 106 is analyzed using EBSD, of those primary particles 20 that are included in the cross section under analysis, it is preferred that the aggregate area of the primary particles 20 that have an orientation angle of more than 0° to less than or equal to 30° relative to the plate face of the positive electrode 106 is greater than or equal to 70% when compared to the total area of the primary particles 20 contained in the cross section being analyzed.

In this manner, the rate characteristics can be further enhanced since the proportion of primary particles 20 that exhibit mutual adhesion is increased.

When further enhancement in the rate characteristics is taken into account, the aggregate area of primary particles 20 relative to the total area of 30 primary particles 20 used in the calculation of the average orientation angle is preferably more than 70%, and still more preferably greater than or equal to 80%.

It is more preferred that the aggregate area of configurations in which the orientation angle of the low angle primary particles is less than or equal to 20° is greater than or equal to 50% relative to the total area of the 30 primary particles 20 used in the calculation of the average orientation angle.

Furthermore, it is more preferred that the aggregate area of configurations in which the orientation angle is less than or equal to 10° of the low angle primary particles is greater than or equal to 15% relative to the total area of the 30 primary particles 20 used in the calculation of the average orientation angle.

5. Average Particle Diameter of Primary Particles 20

The average particle diameter of the 30 primary particles 20 used in the calculation of the average orientation angle is preferably greater than or equal to 5 μm.

In this manner, the rate characteristics are further enhanced since lithium ion conductivity is enhanced overall due to a reduction in the number of grain boundaries between primary particles 20 in the direction of lithium ion conduction.

The average particle diameter of the primary particles 20 is a value obtained as the arithmetic mean of the equivalent circle diameter of each primary particle 20. The equivalent circle diameter is the diameter of a circle having the same area as each primary particle 20 in the EBSD image.

The average particle diameter of the 30 primary particles 20 that are used in the calculation of the average orientation angle is preferably greater than or equal to 7 μm, and particularly preferred to be greater than or equal to 12 μm, when further enhancement in the rate characteristics is considered.

The orientation angle alignment between adjacent primary particles 20 also contributes to rate performance. That is to say, the rate performance is enhanced when the orientation angle difference between adjacent primary particles 20 is small and the grain boundary alignment is high. In particular, there is further improvement to the rate performance when the orientation angle difference is reduced in a direction in which the lithium ions and electrons are conducted. The direction of conduction of lithium ions and electrons is the longitudinal direction of the primary particles 20. The orientation angle difference between primary particles 20 that are adjacent in the longitudinal direction is preferably greater than or equal to 0° and less than or equal to 40°, more preferably greater than or equal to 0° and less than or equal to 30°, and particularly preferably greater than or equal to 0° and less than or equal to 20°.

When the cross section of the positive electrode 106 is analyzed using EBSD, of the primary particles 20 that are contained in the cross section under analysis, the proportion of primary particles 20 in which the orientation angle difference is less than or equal to 40° is preferably greater than or equal to 50%, more preferably greater than or equal to 60% and particularly preferably greater than or equal to 70%.

6. Denseness of Positive Electrode 106

The denseness of the positive electrode 106 is preferably greater than or equal to 70%. In this manner, further enhancement is enabled in relation to the rate characteristics since mutual adhesion between primary particles 20 is further enhanced.

The denseness of the positive electrode 106 is calculated by SEM observation using a magnification of 1000 after polishing a cross section of the positive electrode plate using CP polishing, and binarizing the resulting SEM image.

When further enhancement in relation to the rate characteristics is considered, the denseness of the positive electrode 106 is more preferably greater than or equal to 80%, and particularly preferably greater than 90%.

Although there is no particular limitation on the average equivalent circle diameter of each pore formed in an inner portion of the positive electrode 106, it is preferred to be less than or equal to 8 μm. As the average equivalent circle diameter of each pore is reduced, there is a further improvement in the mutual adhesion of primary particles 20 and therefore there is a further enhancement to the rate characteristics.

The average equivalent circle diameter of the pores is a value that is obtained as the arithmetic mean of the equivalent circle diameter of 10 pores on an EBSD image. The equivalent circle diameter is the diameter of a circle that has the same area of each pore on the EBSD image.

Although each pore formed in an inner portion of the positive electrode 106 may be an open pore that is connected with an external portion of the positive electrode 106, it is preferred that the pore does not penetrate the positive electrode 106. That is to say, it is preferred that each pore does not connect the solid electrolyte-side surface 106a of the positive electrode 106 with the current collecting connection layer-side surface 106b. Each pore may be a closed pore.

Method of Manufacture of Positive Electrode 106

1. Preparation of LiCoO$_2$ Template Particles

An LiCoO$_2$ powder is synthesized by mixing a Li$_2$CO$_3$ starting powder with a Co$_3$O$_4$ starting powder and firing (500° C. to 900° C., 1 to 20 hours).

Plate-shaped LiCoO$_2$ particles that enable conduction of lithium ions parallel to the plate face are obtained by grinding the resulting LiCoO$_2$ powder using a ball mill to have a volume-based D50 particle diameter of 0.1 μm to 10 μm. The resulting LiCoO$_2$ particles exhibit a configuration of tending to cleave along a cleavage plane. The LiCoO$_2$ template particles are prepared by cracking and cleaving the LiCoO$_2$ particles.

This type of LiCoO$_2$ particle can be obtained by a method of synthesizing a plate shaped crystal (a method of cracking after causing grain growth of a green sheet using a LiCoO$_2$ particle slurry, flux growth or hydrothermal synthesis, single crystal growth using melting, a sol-gel method or the like).

In the present step, as discussed below, it is possible to control the profile of the primary particles 20 that configure the positive electrode 106.

Firstly it is possible to control the aggregate area ratio of the low angle primary particles having an orientation angle of greater than 0° and less than or equal to 30° by adjusting at least one of the particle diameter and the aspect ratio of the LiCoO$_2$ template particles. More specifically, the aggregate area ratio of the low angle primary particles can be increased as the aspect ratio of the LiCoO$_2$ template particles is increased, or as the particle diameter of the LiCoO$_2$ template particles is increased.

The respective particle diameter and aspect ratio of the LiCoO$_2$ template particles can be adjusted by at least one of the particle diameter of the Li$_2$CO$_3$ starting powder and the Co$_3$O$_4$ starting powder, the milling conditions during milling (milling time, milling energy, milling method or the like), and the classification conducted after milling.

Furthermore it is possible to control the average particle diameter of the primary particles 20 by adjusting the particle diameter of the LiCoO$_2$ template particles.

Furthermore it is possible to control the denseness of the positive electrode 106 by adjusting the particle diameter of the LiCoO$_2$ template particles. More specifically, the denseness of the positive electrode 106 increases as the particle diameter of the LiCoO$_2$ template particles is reduced.

2. Preparation of Matrix Particles

A Co$_3$O$_4$ starting powder is used as matrix particles. There is no particular limit in relation to the volume-based D50 particle diameter of the Co$_3$O$_4$ starting material powder, and for example, it may be 0.1 to 1.0 μm. It is preferred that it is smaller than the volume-based D50 particle diameter of the LiCoO$_2$ template particles. The matrix particles can be obtained by thermal processing of the Co(OH)$_2$ starting material for 1 to 10 hours at 500° C. to 800° C. Furthermore, in addition to Co$_3$O$_4$, Co(OH)$_2$ particles, or LiCoO$_2$ particles may be used in the matrix particles.

In the present step, as described below, it is possible to control the profile of the primary particles 20 that configure the positive electrode 106.

Firstly the aggregate area ratio of the low angle primary particles that have an orientation angle of more than 0° and less than or equal to 30° can be controlled by adjusting the ratio of the particle diameter of the matrix particles relative to the particle diameter of the LiCoO$_2$ template particles (referred to below as "matrix/template particle diameter ratio"). More specifically, as the matrix/template particle diameter ratio becomes smaller, that is to say, as the particle diameter of the matrix particles becomes small, since there is a tendency for the matrix particles in the firing step described below to be incorporated in the LiCoO$_2$ template particles, the aggregate area ratio of the low angle primary particles can be increased.

Furthermore, the denseness of the positive electrode 106 can be controlled by adjusting the matrix/template particle diameter ratio. More specifically, as the matrix/template particle diameter ratio becomes small, that is to say, as the particle diameter of the matrix particles becomes small, the denseness of the positive electrode 106 is increased.

3. Preparation of Green Sheet

A powder containing a mixture of $LiCoO_2$ template particles and matrix particles in a proportion of 100:3~3:97, a dispersing medium, a binder, a plasticizer, and a dispersing agent are mixed. Under reduced pressure, stirring and degassing are performed, and the mixture is adjusted to a desired viscosity to thereby prepare a slurry.

Next, a green body is formed by molding the prepared slurry by use of a molding method that enables application of a shearing force to the $LiCoO_2$ template particles. In this manner, an average orientation angle for each primary particle 20 can be configured to be more than 0° and less than or equal to 30°.

A doctor blade method is suitably applied as a molding method that enables application of a shearing force to the $LiCoO_2$ template particles. When using a doctor blade method, a green sheet can be formed as the green body by molding the prepared slurry onto a PET film.

The present step as described below enables control of the profile of the primary particles 20 that configure the positive electrode 106.

Firstly, the aggregate area ratio of the low angle primary particles that have an orientation angle of more than 0° and less than or equal to 30° can be controlled by adjusting the molding speed. More specifically, as the molding speed increases, the aggregate area ratio of the low angle primary particles can be increased.

Furthermore, the density of the green body can be adjusted to thereby control the average particle diameter of the primary particles 20. More specifically, as the density of the green body becomes larger, the average particle diameter of the primary particles 20 can be increased.

Furthermore, the denseness of the positive electrode 106 can also be controlled by adjusting the mixing ratio of the $LiCoO_2$ template particles and matrix particles. More specifically, as the number of $LiCoO_2$ template particles increases, the denseness of the positive electrode 106 can be reduced.

4. Preparation of Oriented Sintered Plate

The green body of the slurry is placed into a zirconia setter and subjected to thermal processing (500° C. to 900° C., 1 to 10 hours) to thereby obtain a sintered plate as an intermediate body.

Next, the sintered plate is sandwiched from the top and the bottom by a lithium sheet so that the synthesized lithium sheet has an Li/Co ratio of 1.0, and placed on a zirconia setter. However, the Li/Co ratio may be in excess by about 0.1 to 1.5. Grain growth is promoted by reason of the Li/Co ratio being in excess by more than 1.0. The behavior of the grain growth can be controlled by changing the material and denseness of the setter. For example, grain growth can be controlled by use of a dense magnesia setter that tends not to react with lithium.

Next, the setter is placed in an alumina sheath and after firing in air (700° C. to 850° C., 1 to 20 hours), the sintered plate is sandwiched on the top and the bottom by a lithium sheet, and subjected to further firing (750° C. to 900° C., 1 to 40 hours) to thereby obtain an $LiCoO_2$ sintered plate. The firing step may be separated into two steps, or may be performed on a single occasion. When firing is performed twice, the first firing temperature is preferably lower than the second firing temperature.

The present step as described below enables control of the profile of the primary particles 20 that configure the positive electrode 106.

Firstly, the aggregate area ratio of the low angle primary particles that have an orientation angle of more than 0° and less than or equal to 30° can be controlled by adjusting the rate of increase in temperature during firing. More specifically, as the rate of increase in temperature increases, sintering between matrix particles is suppressed and the aggregate area ratio of the low angle primary particles can be increased.

Furthermore, the aggregate area ratio of the low angle primary particles that have an orientation angle of more than 0° and less than or equal to 30° can be controlled by adjusting the thermal processing temperature for the intermediate body. More specifically, as the thermal processing temperature for the intermediate body becomes lower, sintering between matrix particles is suppressed and the aggregate area ratio of the low angle primary particles can be increased.

Furthermore, at least one of the thermal processing temperature for the intermediate body and the rate of increase in temperature during firing can be adjusted to thereby control the average particle diameter of the primary particles 20. More specifically, as the rate of increase in temperature increases, or as the thermal processing temperature for the intermediate body becomes lower, the average particle diameter of the primary particles 20 can be increased.

Furthermore, at least one of the Li (for example, $Li_2CO_3$) amount during firing and the sintering additive (for example, boric acid, bismuth oxide) amount can be adjusted to thereby control the average particle diameter of the primary particles 20. More specifically, as the amount of Li increases, or as the amount of the sintering additive increases, the average particle diameter of the primary particles 20 can be increased.

Furthermore the denseness of the positive electrode 106 can be controlled by adjusting the profile during firing. More specifically, as the firing temperature is lowered, or as the firing time is increased, the denseness of the positive electrode 106 can be increased.

Other Embodiments

The present invention is not limited to the above embodiment, and various changes or modifications may be added within a scope that does not depart from the scope of the invention.

In the above embodiment, although an example has been explained in which there is application of the positive electrode according to the present invention to the positive electrode 106 of a lithium ion battery 100, application is also possible of the positive electrode to other battery configurations.

For example, the positive electrode according to the present invention can be used in a lithium ion battery using an electrolyte such as an ionic liquid electrolyte, a polymer electrolyte, a gel electrolyte, or an organic liquid electrolyte. An ionic liquid electrolyte solution comprises an ionic liquid cation, an ionic liquid anion and an electrolyte. The ionic liquid cation includes a 1-ethyl-3-methylimidazolium cation (EMI), a 1-methyl-1-propylpyrrolidinium cation (P13), 1-methyl-1-propylpiperidinium cation (PP13), and derivatives and arbitrary combinations thereof. The ionic liquid anions include a bis-(trifluoromethylsulfonyl) imide anion (TFSI), a bis-(fluorosulfonyl) imide anion (FSI) and combinations thereof. The electrolyte includes a bis-(trifluoro methyl sulfonyl) imide lithium salt (LiTFSI), a lithium bis-(fluorosulfonyl) imide lithium salt (LiFSI), and combinations thereof. When using an ionic liquid electrolyte, an ionic liquid electrolyte may be used in isolation, or a configuration in which an ionic liquid is stained into the pores of a separator (for example, a cellulose-based configuration) may be used.

EXAMPLES

Although the examples of a lithium ion battery according to the present invention will be described below, the present invention is not thereby limited to the following examples.

Preparation of Examples 1 to 8

1. Preparation of LCO Template Particles

A $Co_3O_4$ starting material powder (volume-based D50 particle diameter 0.8 µm, manufactured by Seido Chemical Industry Co., Ltd.) and $Li_2CO_3$ starting material powder (volume-based D50 particle diameter 2.5 µm, manufactured by Honjo Chemical Corporation) were mixed and fired for 5 hours at 800° C. to synthesize a $LiCoO_2$ starting material powder. At that time, the firing temperature or firing time was adjusted to thereby adjust the volume-based D50 particle diameter of the $LiCoO_2$ starting material powder to the values shown in Table 1.

Plate-shaped $LiCoO_2$ particles (LCO template particles) were obtained by grinding the resulting $LiCoO_2$ powder. Examples 1 and 2 and 4 to 8 used a pot mill, and Example 3 used a wet jet mill. At this time, the grinding time was adjusted to thereby adjust the volume-based D50 particle diameter of the LCO template particles to the values shown in Table 1. The aspect ratio of the $LiCoO_2$ template particles is shown in Table 1. The aspect ratio of $LiCoO_2$ template particles was measured by using SEM to observe the resulting template particles.

2. Preparation of CoO Matrix Particles

A $Co_3O_4$ starting material powder (manufactured by Seido Chemical Industry Co., Ltd.) was used as a matrix particle. The volume-based D50 particle diameter of the matrix particles is shown in Table 1. However, in Example 4, a matrix particle was not used.

3. Preparation of Green Sheet

LCO template particles and CoO matrix particles were mixed. The weight ratio of the LCO template particles and CoO matrix particles was configured as shown in Table 1. However since matrix particles were not used in Example 4, the weight ratio is 100:0.

100 parts by weight of the mixed powder and 100 parts by weight of a dispersion medium (toluene:isopropanol=1:1), 10 parts by weight of a binder (polyvinyl butyral: No. BM-2, manufactured by Sekisui Chemical Co., Ltd.), 4 parts by weight of a plasticizer (DOP: di(2-ethylhexyl) phthalate manufactured by Kurogane Kasei Co., Ltd.) and 2 parts by weight of a dispersing agent (product name: RHEODOL SP-O30, manufactured by Kao Corporation) were mixed. The mixture was stirred under reduced pressure, degassed and the viscosity was adjusted to 400010000 cP to thereby prepare a slurry. The viscosity was measured with an LVT viscometer manufactured by Brookfield.

The resulting slurry was formed into a sheet shaped configuration on a PET film using a doctor blade method at a molding rate of 100 m/h to thereby have a thickness after drying of 40 µm.

4. Preparation of Oriented Sintered Plate

The $Co_3O_4$ sintered plate was obtained by placing the green sheet that was peeled from the PET film in a zirconia setter and performing primary firing. As shown in Table 1, the firing conditions in Examples 1 to 6 and 8 were 900° C. and 5 hours and in Example 7, 800° C. and 5 hours.

The $LiCoO_2$ sintered plate was obtained by causing the Li/Co ratio of the synthesized lithium sheet to coincide with the ratio shown Table 1 by sandwiching the $Co_3O_4$ sintered plate from the top and the bottom by a lithium sheet, placing on a zirconia setter and performing secondary firing. More specifically, a zirconia setter is placed in a 90 mm square alumina sheath, and after retaining in air at 800° C. for 5 hours, further sandwiching is performed from the top and the bottom by a lithium sheet and firing is performed at 900° C. for 20 hours.

5. Preparation of Solid Electrolyte Layer

A lithium phosphate sintered body target having a diameter of 4 inches (about 10 cm) was prepared, and sputtering was executed using a sputtering apparatus (SPF-430H manufactured by Canon Anerva Corporation) in an RF magnetron configuration to form a film thickness of 2 µm using a gas species of $N_2$ at 0.2 Pa and an output of 0.2 kW. In this manner, a LiPON-type solid electrolyte sputter film having a thickness of 2 µm is formed on $LiCoO_2$ sintered plate.

6. Preparation of Lithium Ion Battery

A 500 Å Au film was formed on the solid electrolyte layer by sputtering using an ion sputtering apparatus (JFC-1500 manufactured by JEOL Ltd).

A tungsten boat loaded with lithium metal was prepared. A vacuum vapor deposition apparatus (carbon coater SVC-700 manufactured by Sanyu Electron Co., Ltd.) was used to vaporize Li using resistance heating and thereby deposit a thin film on the surface of the intermediate layer. At that time, a mask was used to form the size of the negative electrode layer as 9.5 mm square and so that the negative electrode layer was restricted to within the 10 mm square positive electrode region. In this manner, a unit battery was prepared by forming an Li deposition film having a film thickness of 10 µm as a negative electrode on the solid electrolyte layer.

A positive electrode current collection plate was formed by cutting out stainless steel foil having a thickness of 20 µm into 13 mm square. Furthermore, a frame-shaped modified polypropylene resin film (thickness 100 µm) having a width of 1 mm was prepared by punching holes that are 13 mm square on an outer edge and 11 mm square on an inner side. The frame-shaped resin film was stacked on an outer peripheral portion of the positive-electrode current collection plate and subjected to thermal press bonding to thereby form an end sealing portion. The unit battery was placed in a region surrounded by the end sealing portion on the positive-electrode current collection plate. Stainless steel foil having a thickness of 20 µm was placed in the same manner as described above on the negative electrode side of the disposed unit battery, and while a load was applied to the end sealing portion, heating was applied at 200° C. under reduced pressure. In this manner, the upper and lower two layers of stainless steel foil and the end sealing portion were bonded along the entire outer periphery to thereby seal the unit battery. In this manner, a totally solid lithium battery was obtained in a sealed state.

Preparation of Comparative Example 1

In Comparative Example 1, the $LiCoO_2$ powder is not pulverized, and therefore with the exception of using the LCO template particles without modification, a solid lithium battery was obtained using the same processing steps as those described in Examples 1 to 8.

Preparation of Comparative Example 2

In Comparative Example 2, with the exception that the volume-based D50 particle diameter of the CoO matrix particles is greater than that used in Examples 1 to 8, a solid lithium battery was obtained using the same processing steps as those described in Examples 1 to 8. The volume-based D50 particle diameter of the matrix particles in Comparative Example 2 was 3.0 μm, and the particle diameter ratio of the LCO template particles relative to the CoO matrix particles was 0.2.

Preparation of Comparative Example 3

In Comparative Example 3, with the exception that the LCO template particles were not used, and a green sheet was prepared with a slurry only using CoO matrix particles, a solid lithium battery was obtained using the same processing steps as those described in Examples 1 to 8.

Preparation of Comparative Example 4

In Comparative Example 4, with the exception that the firing temperature for the primary firing was 1200° C., a solid lithium battery was obtained using the same processing steps as those described in Examples 1 to 8.

Observation of Primary Particles Configuring Positive Electrode

A scanning electron microscope (JSM-7800M manufactured by JEOL Ltd.) provided with a backscattered electron diffraction image system was used to acquire an EBSD image of a cross section that is vertical to the plate face of the positive electrode. The average orientation angle of the primary particles was calculated by taking the arithmetic mean of the orientation angle of 30 primary particles that are arbitrarily selected on the EBSD image. The calculation results are shown in Table 2.

In the EBSD image, a calculation was performed of the ratio (%) of the aggregate area of the primary particles having an orientation angle of greater than 0° and less than or equal to 30° relative to the total area of 30 primary particles used in the calculation of the average orientation angle. The calculation results are shown in Table 2.

The average particle diameter of the 30 primary particles in the EBSD image, used in the calculation of the average orientation angle was calculated. More specifically, the average particle diameter of the primary particles was taken to be the value of the arithmetic mean of the equivalent circle diameter of the respective 30 primary particles. The calculation results are shown in Table 2.

The average aspect ratio of the 30 primary particles in the EBSD image used in the calculation of the average orientation angle was calculated. More specifically, the average aspect ratio of the primary particles was taken to be the value of the arithmetic mean for values in which the maximum Feret diameter is divided by the minimum Feret diameter for the respective 30 primary particles. The calculation results are shown in Table 2.

The area ratio was calculated for the primary particles having an aspect ratio greater than or equal to 4 in the EBSD image from among the 30 primary particles used in the calculation of the average orientation angle. The calculation results are shown in Table 2.

Denseness of Positive Electrode

An SEM image using a magnification of 1000 of a CP polished cross section of the positive electrode plate was binarized. Then, the denseness was calculated as the area ratio of the solid phase to the aggregate area of the solid phase and the gaseous phase in the binarized image. The calculation results are shown in Table 2.

Rate Performance

After charging the lithium ion battery to 4.2[V] using a 0.1 [mA] constant current, charging was performed using a constant voltage to a current of 0.05 [mA]. Then discharging was performed using a 0.2 [mA] constant current to 3.0 [V] and the discharge capacity W0 was measured. Then, after charging to 4.2[V] using a 0.1 [mA] constant current, charging was performed using a constant voltage to a current of 0.05 [mA]. Then discharging was performed using a 2.0 [mA] constant current to 3.0 [V] and the discharge capacity W1 was measured. The rate performance is evaluated by dividing W1 by W0.

Cycle Capacity Retention Rate

After charging the lithium ion battery to 4.2[V] using a 0.1 [mA] constant current, charging was performed using a constant voltage to a current of 0.05 [mA]. Then discharging was performed using a 0.2 [mA] constant current to 3.0 [V] and the discharge capacity W0 was measured. The measurement was repeated 30 times to thereby measure the $30^{th}$ discharge capacity W30. The cycle capacity retention rate was evaluated by dividing the W30 by W0.

TABLE 1

| | LCO Template Particles | | | | CoO Matrix Particles Particle Diameter (D50) of CoO Matrix Particles | Template:Matrix (Weight Ratio) | Template Particle Diameter:Matrix Particle Diameter |
|---|---|---|---|---|---|---|---|
| | Particle Diameter (D50) of LCO Starting Material Powder | Grinding Method | Particle Diameter (D50) of Template Particles | Aspect Ratio Template Particles | | | |
| Example 1 | 3.0 μm | pot mill | 0.6 μm | 5 | 0.3 μm | 50:50 | 2.0 |
| Example 2 | 10.0 μm | pot mill | 2.2 μm | 10 | 0.3 μm | 50:50 | 7.3 |
| Example 3 | 3.0 μm | wet jet mill | 1.3 μm | 15 | 0.3 μm | 50:50 | 4.3 |
| Example 4 | 3.0 μm | pot mill | 0.6 μm | 5 | — | 100:0 | — |
| Example 5 | 3.0 μm | pot mill | 0.6 μm | 5 | 0.3 μm | 10:90 | 2.0 |
| Example 6 | 10.0 μm | pot mill | 2.5 μm | 10 | 0.8 μm | 50:50 | 3.1 |
| Example 7 | 3.0 μm | pot mill | 0.6 μm | 5 | 0.3 μm | 50:50 | 2.0 |
| Example 8 | 3.0 μm | pot mill | 0.6 μm | 5 | 0.3 μm | 50:50 | 2.0 |
| Comparative Example 1 | 3.0 μm | — | 3.0 μm | 1 | 0.3 μm | 50:50 | 10.0 |
| Comparative Example 2 | 3.0 μm | pot mill | 0.6 μm | 5 | 3.0 μm | 50:50 | 0.2 |
| Comparative Example 3 | — | — | — | — | 0.3 μm | 0:100 | — |

TABLE 1-continued

| | | | | | | | | |
|---|---|---|---|---|---|---|---|---|
| Comparative Example 4 | 3.0 μm | pot mill | 0.6 μm | 5 | | 0.3 μm | 50:50 | 2.0 |

| | Molding | | Primary Firing | | Secondary Firing | | |
|---|---|---|---|---|---|---|---|
| | Molding Rate | Film Thickness | Firing Temp. | Li/Co | RetentionTemp. | Firing Temp. | Temp. Increase Rate |
| Example 1 | 100 m/h | 40 μm | 900° C. | 1.05 | 800° C. | 900° C. | 200° C./h |
| Example 2 | 100 m/h | 40 μm | 900° C. | 1.05 | 800° C. | 900° C. | 200° C./h |
| Example 3 | 100 m/h | 40 μm | 900° C. | 1.05 | 800° C. | 900° C. | 200° C./h |
| Example 4 | 100 m/h | 40 μm | 900° C. | 1.2 | 800° C. | 900° C. | 200° C./h |
| Example 5 | 100 m/h | 40 μm | 900° C. | 1.05 | 800° C. | 900° C. | 200° C./h |
| Example 6 | 100 m/h | 40 μm | 900° C. | 1.05 | 800° C. | 900° C. | 200° C./h |
| Example 7 | 100 m/h | 40 μm | 800° C. | 1.05 | 800° C. | 900° C. | 200° C./h |
| Example 8 | 100 m/h | 40 μm | 900° C. | 1.05 | 800° C. | 900° C. | 400° C./h |
| Comparative Example 1 | 100 m/h | 40 μm | 900° C. | 1.05 | 800° C. | 900° C. | 200° C./h |
| Comparative Example 2 | 100 m/h | 40 μm | 900° C. | 1.05 | 800° C. | 900° C. | 200° C./h |
| Comparative Example 3 | 100 m/h | 40 μm | 900° C. | 1.05 | 800° C. | 900° C. | 200° C./h |
| Comparative Example 4 | 100 m/h | 40 μm | 1200° C. | 1.05 | 800° C. | 900° C. | 200° C./h |

TABLE 2

Postive Electrode Evaluation Results

| | Denseness | Average Orientation Angle of Primary Particles | Surface Area Ratio Of Primary Particles Within Orientation Angle of 30° | Average Particle Diameter of Primary Particles | Rate Performance | Cycle Capacity Retention Rate |
|---|---|---|---|---|---|---|
| Example 1 | 98% | 18° | 80% | 7 μm | 70% | 90% |
| Example 2 | 95% | 15° | 85% | 20 μm | 84% | 94% |
| Example 3 | 97% | 12° | 90% | 15 μm | 80% | 95% |
| Example 4 | 90% | 5° | 90% | 5 μm | 55% | 98% |
| Example 5 | 99% | 25° | 70% | 12 μm | 65% | 75% |
| Example 6 | 97% | 13° | 95% | 15 μm | 88% | 95% |
| Example 7 | 99% | 20° | 80% | 15 μm | 75% | 80% |
| Example 8 | 98% | 15° | 90% | 12 μm | 80% | 94% |
| Comparative Example 1 | 95% | 50° | 20% | 8 μm | 20% | 30% |
| Comparative Example 2 | 96% | 50° | 20% | 7 μm | 20% | 30% |
| Comparative Example 3 | 99% | 50° | 20% | 10 μm | 30% | 25% |
| Comparative Example 4 | 99% | 60° | 15% | 5 μm | 20% | — |

As shown in Table 2, in Examples 1 to 8, a green body for the positive electrode was formed using a molding method in which a shear force was applied to the plate-shaped LCO template particles to thereby configure the orientation angle of the (003) plane of the primary particles to less than or equal to 25°. Furthermore, in Examples 1 to 8, the area ratio of primary particles having an orientation angle of greater than 0° and less than or equal to 30° was configured to be greater or equal to 70%. As a result, the alignment (that is to say, grain boundary alignment) of the orientation angle of adjacent primary particles is increased, and therefore it was possible to enhance the rate performance in addition to the cycle capacity retention rate.

Furthermore, an additional enhancement was enabled to the cycle capacity retention rate in Examples 1 to 4, and 6 to 8 in which the area ratio of primary particles having an orientation angle of greater than 0° and less than or equal to 30° was configured to be greater or equal to 80%.

In addition, when compared to Examples 1, 4 and 5 in which the average particle diameter of the primary particles was 5 μm, a further enhancement was enabled to the rate performance in Examples 2, 3, and 6 to 8 in which the average particle diameter of the primary particles was greater than or equal to 12 μm.

Furthermore, as shown by a comparison with Examples 4 and 5, a further enhancement was enabled to the rate performed by a configuration in which the denseness of the positive electrode was greater than 90%.

The invention claimed is:

1. A positive electrode comprising a plurality of mutually bonded primary particles respectively composed of a lithium composite oxide having a layered rock-salt structure,
    an average orientation angle of the plurality of primary particles relative to a plate face direction parallel to a plate face is more than 5° and less than or equal to 25°, and
    an aggregate area of primary particles that have an orientation angle relative to the plate face direction of more than 0° and less than or equal to 30° is greater than or equal to 70% relative to a total area of the plurality of primary particles, in a cross section.

2. The positive electrode according to claim 1, wherein an average particle diameter of the plurality of primary particles is greater than or equal to 5 μm and less than or equal to 20 μm.

3. The positive electrode according to claim 1, wherein a denseness is greater than 90%.

4. The positive electrode according to claim 1, wherein the lithium composite oxide comprises an oxide that is expressed as $Li_xMO_2$, wherein $0.05<x<1.10$, and wherein M is at least one transition metal.

5. The positive electrode according to claim 4, wherein the transition metal is selected from the group consisting of Co, Ni, and Mn.

6. A lithium ion battery comprising:
a positive electrode portion composed of a positive electrode-side current collecting layer and a positive electrode which is electrically connected to the positive electrode-side current collecting layer; and
a negative electrode portion composed of a negative electrode-side current collecting layer and a negative electrode layer which is electrically connected to the negative electrode-side current collecting layer, wherein:
the positive electrode comprises a plurality of mutually bonded primary particles respectively composed of a lithium composite oxide having a layered rock-salt structure,
an average orientation angle of the plurality of primary particles relative to a plate face direction parallel to a plate face is more than 5° and less than or equal to 25°, and
an aggregate area of primary particles that have an orientation angle relative to the plate face direction of more than 0° and less than or equal to 30° is greater than or equal to 70% relative to a total area of the plurality of primary particles, in a cross section.

7. The lithium ion battery according to claim 6, wherein an average particle diameter of the plurality of primary particles is greater than or equal to 5 μm and less than or equal to 20 μm.

8. The lithium ion battery according to claim 6, wherein a denseness is greater than 90%.

9. The lithium ion battery according to claim 6, wherein the lithium composite oxide comprises an oxide that is expressed as $Li_xMO_2$, wherein $0.05<x<1.10$, and wherein M is at least one transition metal.

10. The lithium ion battery according to claim 9, wherein the transition metal is selected from the group consisting of Co, Ni, and Mn.

11. The lithium ion battery according to claim 6, wherein the lithium ion battery is a chip lithium ion battery.

12. The lithium ion battery according to claim 6, further comprising:
an organic liquid electrolyte; and
a separator.

* * * * *